Dec. 23, 1952    Z. A. BRUEGGER    2,623,135
ACCELERATOR PEDAL SWITCH
Filed May 26, 1950

INVENTOR.
Z. A. Bruegger,
BY Victor J. Evans & Co.
ATTORNEYS

Patented Dec. 23, 1952

2,623,135

UNITED STATES PATENT OFFICE 2,623,135

ACCELERATOR PEDAL SWITCH

Z. A. Bruegger, Boise, Idaho

Application May 26, 1950, Serial No. 164,573

1 Claim. (Cl. 200—59)

This invention relates to foot actuated switches for direction signals of motor vehicles, and in particular a lever pivotally mounted on the under surface of an accelerator pedal with engaging arms extended upwardly at the sides and with a contact element positioned to engage contacts positioned at the sides of the opposite end of the lever.

The purpose of this invention is to provide a positive action for a foot actuated accelerator pedal switch wherein circuits are completed by twisting the foot toward either side.

Various attempts have been made to incorporate signal switches on accelerator pedals particularly where the switches are actuated by the toe of the foot but it has been found difficult to design a switch that may be actuated with the foot in the natural position and with a slight twisting movement of the foot. With this thought in mind this invention contemplates a lever having upwardly extended arms positioned against the under surface of the accelerator pedal with the lever pivotally connected to the pedal at a point corresponding to the center of a twisting movement of the foot on the accelerator pedal and with contacts provided on the end of the lever opposite to that from which the foot engaging arms extend.

The object of this invention is, therefore, to provide means for constructing a foot actuated switch so that it may be mounted on the under surface of an accelerator pedal and actuated with a natural movement of the foot.

Another object of the invention is to provide a direction signal accelerator pedal switch that may be mounted on accelerator pedals of vehicles now in use.

A further object of the invention is to provide an accelerator pedal switch for direction signals of motor vehicles which is of a simple and economical construction.

With these and other objects and advantages in view the invention embodies a pair of contacts positioned on an insulated block on the under surface of the lower end of an accelerator pedal, a lever having a contact extended to engage the contacts on the under surface of the accelerator pedal pivotally mounted on the pedal and having upwardly extended arms positioned at the sides of the pedal, and a positioning projection extended from the under surface of the pedal and positioned to snap into a recess in the lever for retaining the lever in a neutral position.

Other features and advantages of the invention will appear from the following description taken in connection with the drawings wherein.

Figure 1:
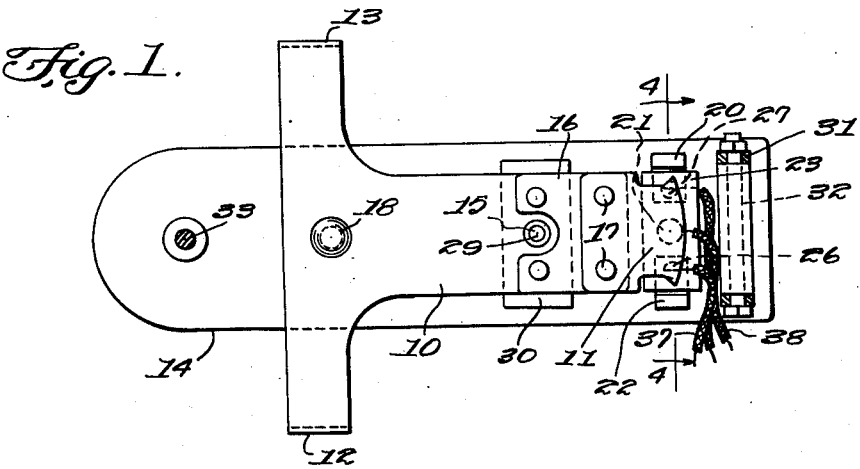
Figure 1 is a view looking upwardly toward the under surface of an accelerator pedal showing the improved signal switch pivotally mounted thereon.

Referring now to the drawings wherein like reference characters denote corresponding parts the direction signal switch of this invention includes a lever 10 having a contact 11 extended from one end with arms 12 and 13 extended upwardly at the sides of an accelerator pedal 14, and with the lever 10 pivotally mounted on the pedal by a bolt 15.

Figure 2:
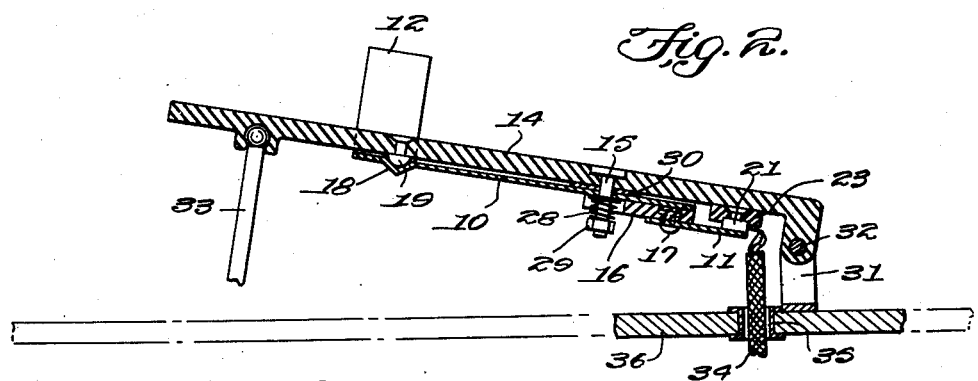
Figure 2 is a longitudinal section through the pedal and switch elements.
Figure 3:
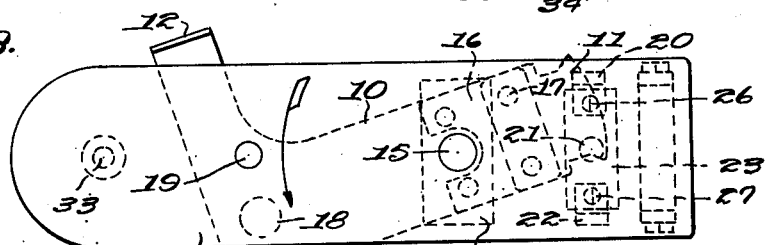
Figure 3 is a plan view of the pedal showing the lever actuated toward one side thereof.

The contact plate 11 is mounted on an insulating block 16 by rivets 17 and the block 16 is mounted on the lower surface of the end of the lever 10, as shown in Figure 2. The opposite end of the lever 10 is provided with a recess 18 that is positioned to receive a projection 19 on the under surface of the foot pedal 14, and with the arms 12 and 13 extended upwardly at the sides of the pedal 14 the lever 10 may be actuated to the position shown in Figure 3 or to a similar position on the opposite side of the pedal.

Figure 4:
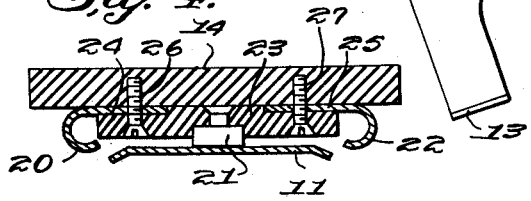
Figure 4 is a cross section through the pedal and switch elements taken on line 4—4 of Figure 1.

The contact plate 11 is positioned to engage contacts 20, 21 and 22 mounted in an insulating block 23 and, as illustrated in Figure 4 the contacts 20 and 22 are formed with circular or U-shaped ends with flanges 24 and 25 thereof, respectively secured to the pedal 14 by screws 26 and 27 that extend through the block 23 and also through the flanges 24 and 25. The screws are threaded into sockets in the pedal 14, as shown.

The bolt 15, which holds the lever 10 against the under surface of the accelerator pedal 14 is provided with a spring 28 and the tension of the spring is adjusted by a nut 29 on the end of the bolt. A washer 30 may also be provided between the lever 10 and the under surface of the accelerator pedal 14.

The accelerator pedal, which is pivotally mounted in a bearing stand 31 by a pin 32 is provided with a control lever 33 at the outer end and the center contact 21 of the block 23 is connected through a source of current supply by a conduit 34 which extends through a thimble 35 in the floor 36 of the vehicle. Similar wires 37 and 38 are connected to the contacts 20 and 22.

With the parts arranged in this manner the wires 37 and 38 are connected to one of the terminals of direction signals and with the other terminals of the signals grounded and with the center wire 34 extended to one terminal of a battery with the other terminal of the battery grounded, it is only necessary to twist the foot to the right to indicate that the vehicle intends to turn to the right, and to the left to indicate that the vehicle intends to turn to the left. By this means it is not necessary to slide the foot upwardly to the upper end of the accelerator pedal and also it is not necessary to remove the hand from the steering wheel. The switch is actuated by the natural movement of the foot and without shifting the foot to a different position.

It will be understood that modifications may be made in the design and arrangement of the parts without departing from the spirit of the invention.

What is claimed is:

In an accelerator pedal foot actuated direction signal switch, the combination which comprises a T-shaped lever having a stem portion and a cross-bar portion respectively pivotally mounted on the under surface of an accelerator pedal of a motor vehicle adjacent that end of the stem remote from the cross-bar portion, said lever having upwardly extended arms at the outer ends of the cross-bar portions that are at the sides of the pedal positioned to be engaged by the sides of a foot on the pedal, a block of insulating material mounted on the under surface of the pedal, a feeder contact having upwardly inclined ends positioned in the said block of insulating material, U-shaped contacts on the said block of insulating material positioned at the sides of the said feeder contact, a second block of insulating material at that end of the lever remote from the cross-bar portion, a contact plate on the insulating block on the lever positioned to engage the said feeder contact and each of the said side contacts alternately, said lever having a recess therein, and a projection on the under surface of the accelerator pedal positioned to snap into the recess of the lever for locating the lever in the neutral position with the said contact plate out of engagement with the said U-shaped side contacts of the block of insulating material on the pedal.

Z. A. BRUEGGER.

REFERENCES CITED

The following references are of record in the file of this patent:

UNITED STATES PATENTS

| Number | Name | Date |
|---|---|---|
| 1,897,681 | Smoyer | Feb. 14, 1933 |
| 1,949,568 | Gotham | Mar. 6, 1934 |
| 2,141,075 | Akers | Dec. 20, 1938 |
| 2,247,135 | Romano et al. | June 24, 1941 |
| 2,462,767 | O'Reilly | Feb. 22, 1949 |